United States Patent
Tsukui et al.

(10) Patent No.: US 6,961,143 B2
(45) Date of Patent: Nov. 1, 2005

(54) INTERNET FACSIMILE APPARATUS AND PRINTING METHOD USING THE SAME

(75) Inventors: Minoru Tsukui, Chiba (JP); Masao Akimoto, Tokyo (JP); Kyoji Saito, Kanagawa (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 851 days.

(21) Appl. No.: 09/862,302

(22) Filed: May 23, 2001

(65) Prior Publication Data

US 2002/0051183 A1     May 2, 2002

(30) Foreign Application Priority Data

Jul. 13, 2000   (JP)  .............................. 2000-212679

(51) Int. Cl.[7] .............................................. B41B 1/00
(52) U.S. Cl. ..................................................... 358/1.15
(58) Field of Search ............................... 358/1.15, 403, 358/1.13, 402, 1.6, 407, 442; 379/100.01, 379/100.12; 709/232, 246; 707/1, 10

(56) References Cited

U.S. PATENT DOCUMENTS 6,092,114 A * 7/2000 Shaffer et al. .............. 709/232
6,128,101 A    10/2000 Saito
6,208,426 B1    3/2001 Saito et al.
6,266,160 B1    7/2001 Saito et al.
6,426,799 B1 * 7/2002 Okimoto et al. ........... 358/1.15

FOREIGN PATENT DOCUMENTS

JP           12-29804       1/2000

* cited by examiner

Primary Examiner—Mark Wallerson
Assistant Examiner—Charlotte M. Baker
(74) Attorney, Agent, or Firm—Greenblum & Bernstein, P.L.C.

(57) ABSTRACT

An Internet facsimile apparatus is provided such that, even when an electronic mail includes plural data files that cannot be processed by the apparatus, prints the electronic mail normally. The apparatus includes a mail analyzer that determines whether a received electronic mail includes data that cannot be printed by a printer. When the electronic mail includes such unprintable data, the unprintable data is transmitted to a conversion server. The apparatus receives back printable data converted from the unprintable data from the conversion server and prints the printable data. The apparatus stores an indication that a plurality of printable data converted from a plurality of unprintable data has been received back from the conversion server. A message ID processor checks the indication, and the printer is informed regarding an object to be printed in accordance with the result of checking by the message ID processor.

8 Claims, 9 Drawing Sheets

600 Attachment file management table

| Message ID | Attachment file No. | File format | Status |
|---|---|---|---|
| 20003311123456A | File 1 | Text | OK |
| 20003311123456A | File 2 | Tiff | OK |
| 20003311123456A | File 3 | MS-word | NG |
| 20003311123456A | File 4 | Jpeg | NG |

Content—Type: Multipart/Mixed
MESSAGE ID:
    from:
    to:
    Message ID: 2000331123456A Content—Type: application/msword (b)

Content—Type: Multipart/Mixed
MESSAGE ID:
    from:
    to:
    Message ID: 2000331123456A Content—Type: image/jpeg

INTERNET FACSIMILE APPARATUS AND PRINTING METHOD USING THE SAME

BACKGROUND OF THE INVENTION

1. Field of the Invention

This invention relates to an Internet facsimile apparatus that is capable of printing predetermined image data transmitted through the Internet and a printing method using the Internet facsimile apparatus.

2. Description of Related Art

Recently, a facsimile apparatus is developed that transmits and receives image data through the Internet in response to an operation similar to a general facsimile apparatus. This type of facsimile apparatus is called an Internet facsimile apparatus, because the Internet is entirely or partially used as a communication path. The Internet facsimile apparatus receives an electronic mail, and converts the electronic mail data into image data. Thus, the Internet facsimile apparatus prints the electronic mail data as well as facsimile data received by normal facsimile communication.

However, when the Internet facsimile apparatus cannot deal with character codes used in the electronic mail, or when a data file, such as a word processing document or a spread sheet, which cannot be expanded by the Internet facsimile apparatus is attached to the electronic mail, the Internet facsimile apparatus cannot print the electronic mail data normally. To deal with this condition, Japanese Laid-Open Patent Publication No. 12-29804 discloses a technique in which, when the Internet facsimile apparatus receives a data file that cannot be processed by the apparatus itself, the Internet facsimile apparatus transfers the data file to a predetermined server apparatus, has the server apparatus convert the data file to a processible data file, and prints the processible data file received from the predetermined server apparatus.

However, in the Internet facsimile apparatus described above, when a variety of plural data files that cannot be processed by the apparatus itself, are attached to the electronic mail, these data files cannot be printed normally.

In other words, in the Internet facsimile apparatus, when these data files are transferred to the predetermined server apparatus, it is not considered that management numbers or the like are given to these data files. Accordingly, when a time lag occurs among replies of the processible data files due to the delay or the number of jobs of the conversion process in the server apparatus, all the data files attached to the received electronic mail may not be printed.

Accordingly, the present invention is provided in view of the above-described problems. An objective of the present invention is, when an electronic mail having plural data files that cannot be processed by the apparatus itself, to provide an Internet facsimile apparatus and a printing method using the Internet facsimile apparatus that can print the electronic mail normally.

SUMMARY OF THE INVENTION

To achieve the above and/or other goals, the present invention analyzes whether a received electronic mail includes data that cannot be printed by a printing unit. When unprintable data is included, the unprintable data is transferred to a predetermined conversion server, and converted data is received back from the conversion server and is printed by the printing unit. At this time, a reply status (indication) that indicates whether a plurality of printable data, converted from a plurality of unprintable data, has received back from the conversion server is stored, and the printing unit is informed regarding an object (data) to be printed in accordance with the reply status (indication).

Accordingly, since a printing operation of the print unit is controlled according to the reply status (indication) that indicates whether a plurality of converted data has received back from the conversion server, even if an electronic mail including a plurality of unprintable data is received, the printing operation can be performed normally.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

Figure 1:
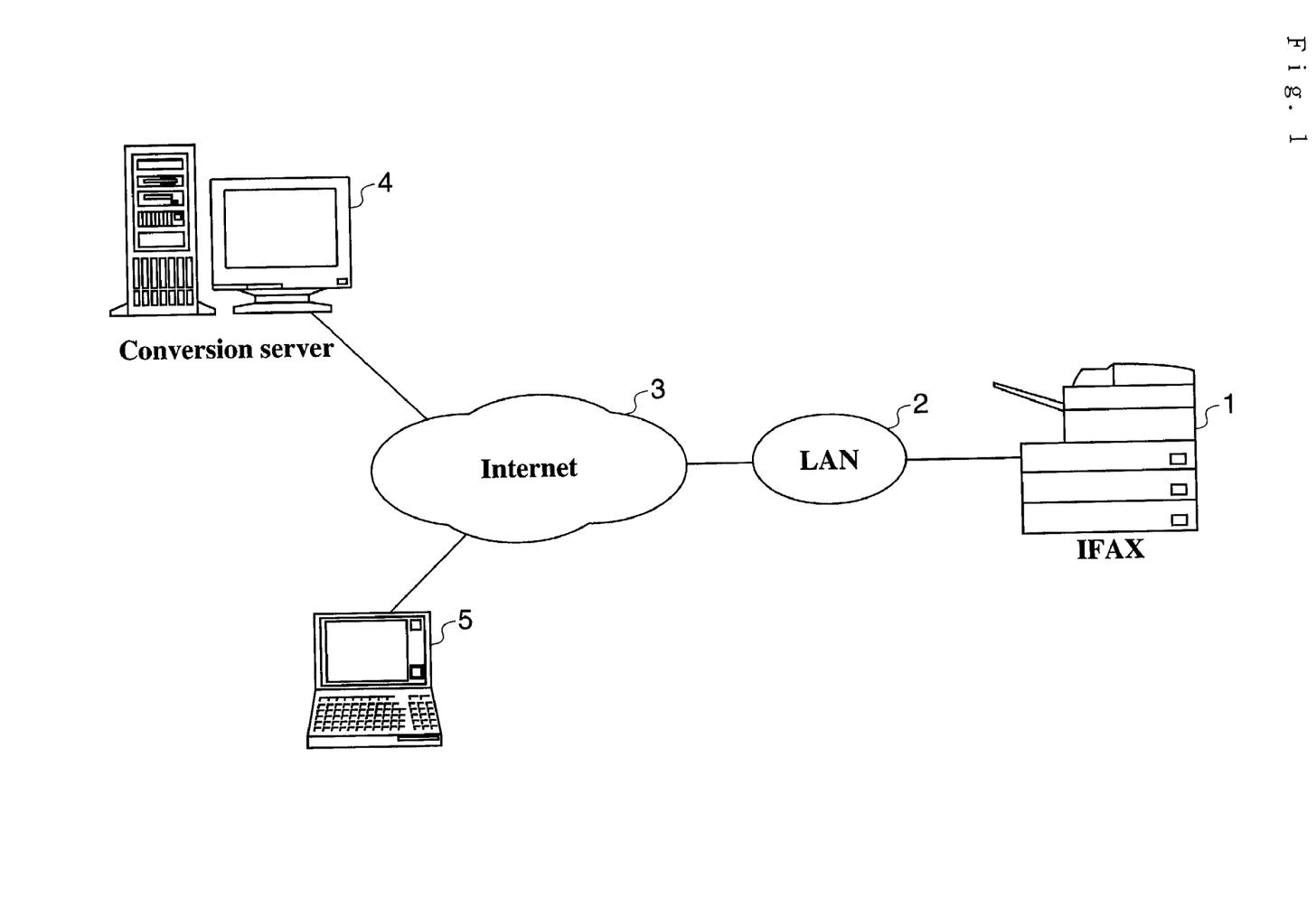
FIG. 1 is a schematic view illustrating a network on which an Internet facsimile apparatus according to the embodiment of the present invention is operated.

FIG. 1 is a schematic diagram illustrating a network on which an Internet facsimile apparatus according to the embodiment of the present invention operates. The Internet facsimile apparatus 1 (hereinafter "IFAX") of the embodiment is connected to Internet 3 via a LAN (Local Area Network) 2. In this embodiment, the LAN 2 is embodied by an Ethernet. However, the LAN 2 can be embodied by a wireless LAN and so on. The Internet 3 is connected to a conversion server 4 and a PC 5 as a mail transceiver terminal, which is capable of sending an electronic mail to the IFAX 1.

Figure 2:
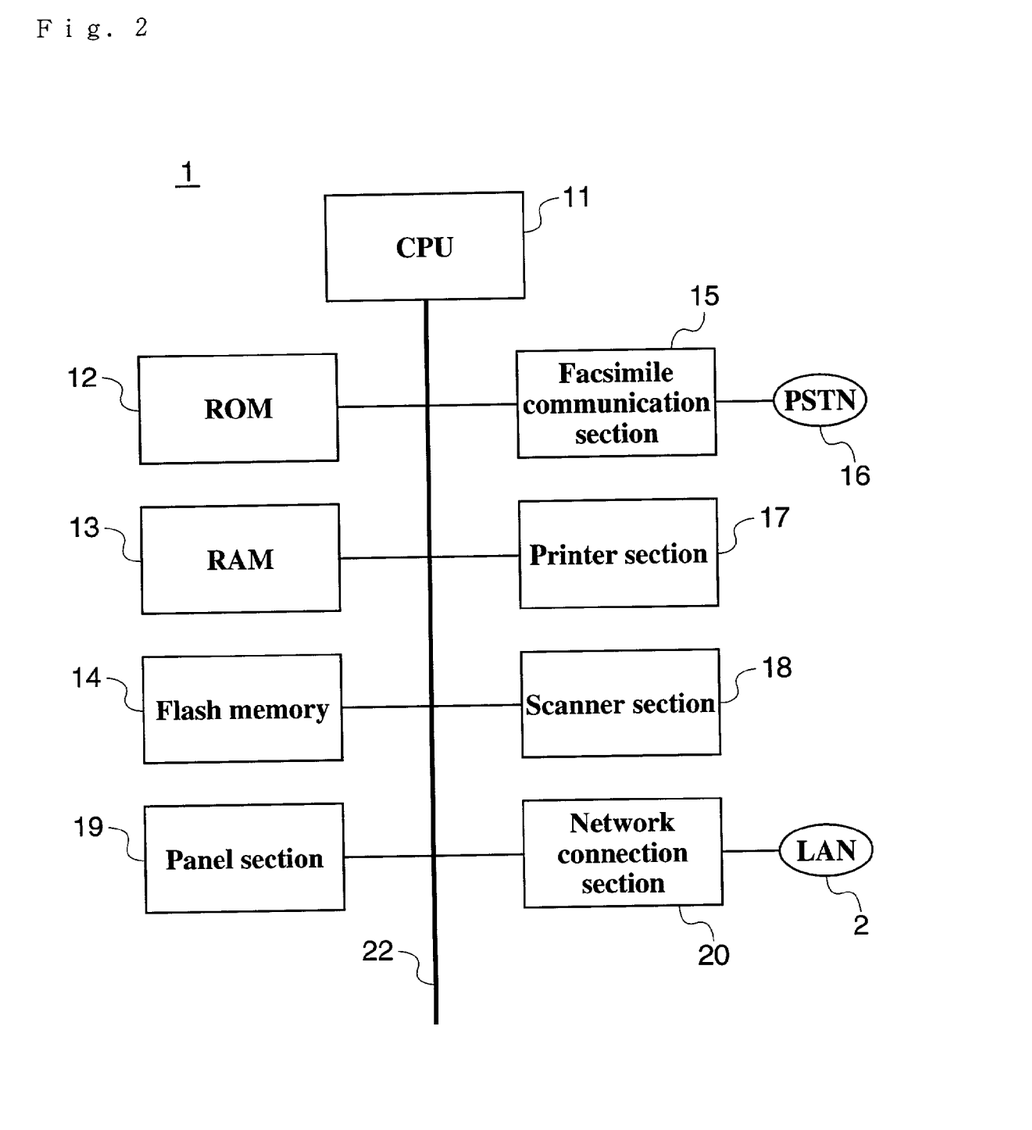
FIG. 2 is a block diagram illustrating hardware configuration of the Internet facsimile apparatus according to the embodiment of the present invention.

FIG. 2 is a block diagram illustrating a hardware configuration of the IFAX 1 according to the embodiment.

The central processing unit (CPU) 11 performs a variety of programs to control each components of the IFAX 1. ROM 12 stores an operation system and basic application software performed by the CPU 11. RAM 13 is used as a data area of the program as well as an image memory storing facsimile data.

A flash memory 14 stores programs, such as a communication control program or an image processing program, which are capable of being updated to a current version, performed by the CPU 11. Instead of the flash memory 14, it is possible to use a nonvolatile semi-conductor memory, such as an EEPROM (Electronic Erasable Programmable Read Only Memory), or a volatile semi-conductor memory, such as an SRAM (Static Random Access Memory), having a backup battery.

A facsimile transmission section 15 communicates with an external facsimile apparatus through a PSTN 16 according to a facsimile communication procedure. The facsimile communication section 15 includes a modem that performs modulation, and an image compressing section and an image expanding section, which perform compression and expansion of image data, respectively.

A printer section 17 prints data. A scanner section 18 scans an original. A panel section 19 is used by the user to operate a variety of operations of the IFAX 1, and displays a variety of information to the user.

A network connection section 20 is an interface that controls transmission/reception of data to/from the LAN 2. A bus 22 is a path through which data transmission is performed among the CPU 11, the ROM 12, the RAM 13, the flash memory 14, the facsimile communication section 15, the printer section 17, the scanner section 18, the panel section 19 and the network connection section 20.

Figure 3:
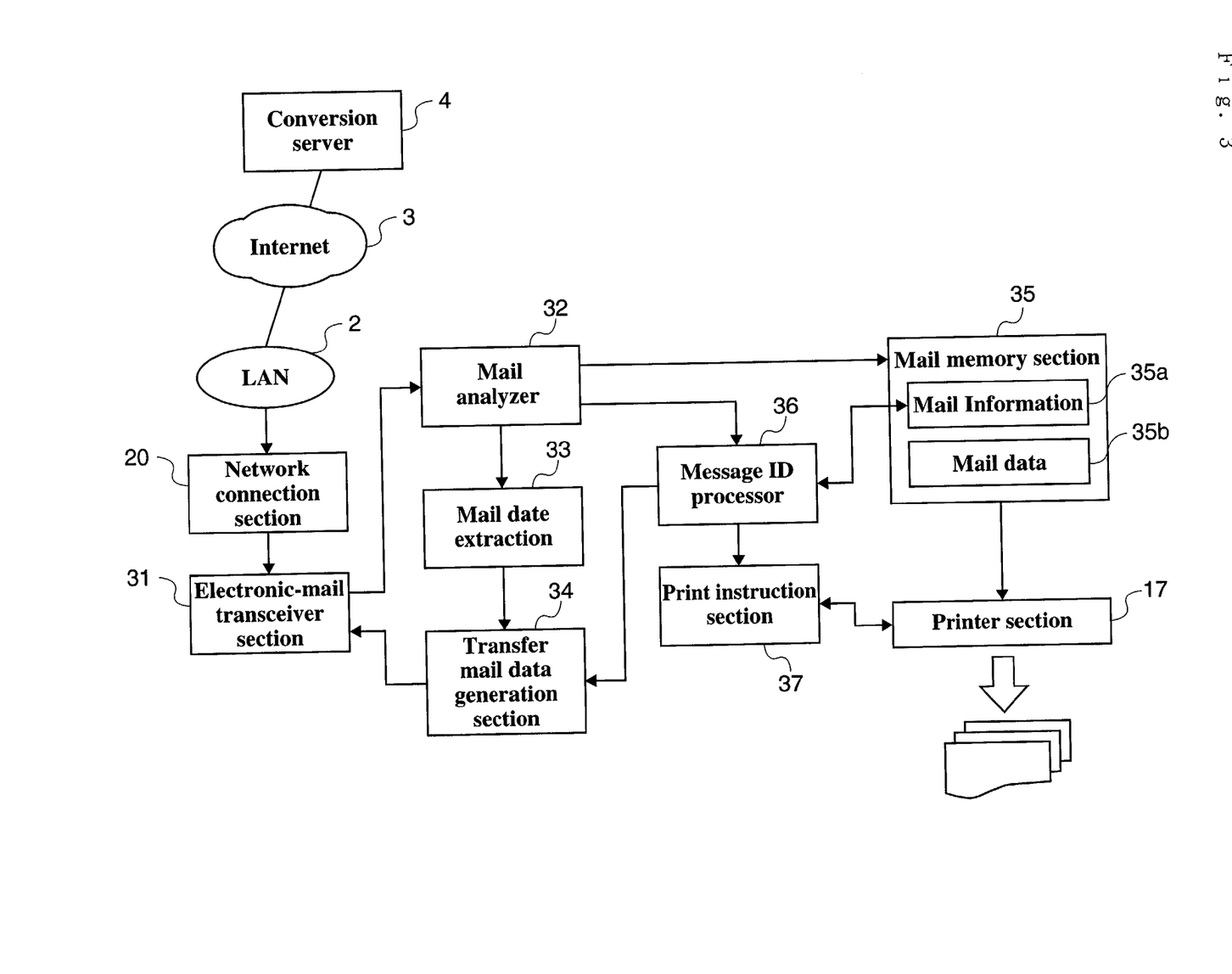
FIG. 3 is a block diagram illustrating main functions of the Internet facsimile apparatus according to the embodiment of the present invention.

FIG. 3 is a block diagram illustrating main functions of the IFAX 1 of the embodiment of the present invention.

An electronic mail transceiver section 31 transmits and receives an electronic mail via the network connection section 20. The electronic mail transceiver section 31 transmits and receives an electronic mail according to a message transfer protocol, such as, for example, a SMTP (Simple Mail Transfer Protocol) or a POP (Post Office Protocol).

A mail analyzer 32 analyzes electronic mail information of an electronic mail received by the electronic mail transceiver section 31. The electronic mail information includes, for example, a message ID, existence of an attachment file, a type and a number of the attachment file. The mail analyzer 32 determines whether the received electronic mail are printable in the IFAX 1 according to the result of the analysis.

A mail data extraction section 33 extracts predetermined data from the electronic mail data. More specifically, the mail data extraction section 33 extracts a message ID, data following to "to", which is destination address information, and a type of an attachment file.

A transfer mail data generation section 34 generates an electronic mail to be transferred to the conversion server 4 (hereinafter a "transfer mail"), according to the predetermined data extracted by the mail data extraction section 33.

A data memory section 35 is provided in the flash memory 14 shown in FIG. 2, and includes a mail information area 35a that stores electronic mail information analyzed by the mail analyzer 32, and a mail data area 35b that stores a body of the electronic mail and an attachment file of the electronic mail. The mail information area 35a further stores an attachment file table including statuses, or the like, that indicates whether the attachment files of the electronic mail after conversion have been received back from the conversion server 4. The attachment file table is described in detail later.

When the electronic mail received by the electronic mail transceiver section 31 is an electronic mail received back from the conversion server 4 (hereinafter "reply (electronic) mail"), a message ID processor 36 compares a message ID given to the electronic mail with the message ID stored in the attachment file table. Thus, the message ID processor 36 indicates a status of reply of the electronic mail received back from the conversion server 4.

Further, the message ID processor 36 determines which file stored in the attachment file table corresponds to the attachment file of the electronic mail received back from the conversion server 4. At this time, the message ID processor 36 determines based on a message ID of the electronic mail received back from the conversion server 4.

Further, the message ID processor 36 refers to the attachment file table, and determines whether all attachment files corresponding to the message ID of the electronic mail received back from the conversion server 4 are printable. When all the attachment files are determined to be printable, the message ID processor 36 informs the print instruction section 37 that all of the attachment files are printable.

Further, when a predetermined period elapses before all the reply mails for all the files stored in the attachment file table have been received back from the conversion server 4, the message ID processor 36 informs the print instruction section 37 that some reply mails have not been received back.

When the print instruction section 37 is informed by the message ID processor 36 that all attachment files corresponding to the message ID of the electronic mail received back from the conversion server 4 are printable, the print instruction section 37 forwards a print instruction to the printer 17.

Further, when the print instruction section 37 is informed that there is a file stored in the attachment file table, for which a reply electronic mail is not received back from the conversion server 4, the print instruction section 37 gives an instruction for the printer 17 to print only the attachment file for which a reply electronic mail is received back.

When the printer 17 receives the print instruction from the print instruction section 37, the printer 17 receives a corresponding electronic mail and an attachment file thereof from the data memory section 35, and performs a print process.

Figure 4:
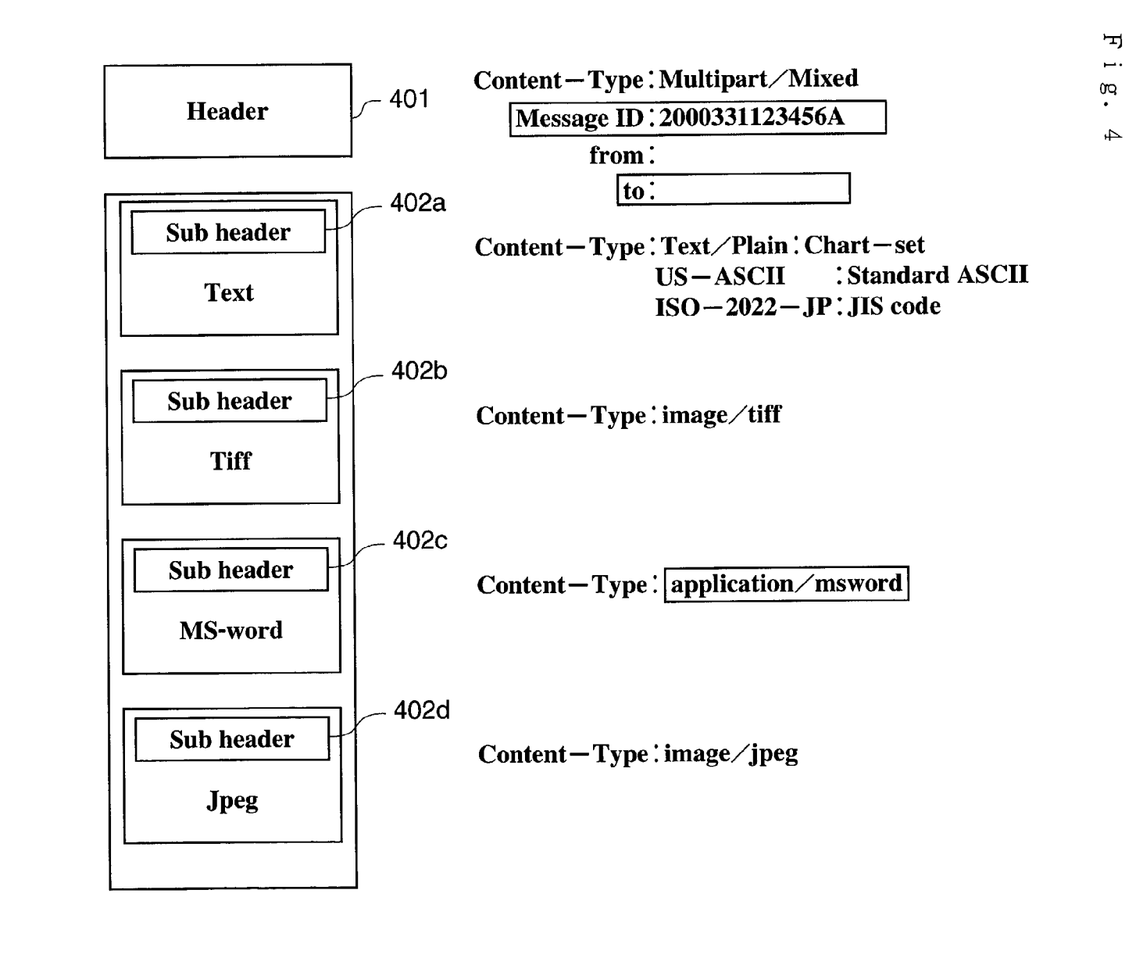
FIG. 4 is a view illustrating an example of an electronic mail received by the Internet facsimile apparatus according to the embodiment of the present invention.
Figure 5:
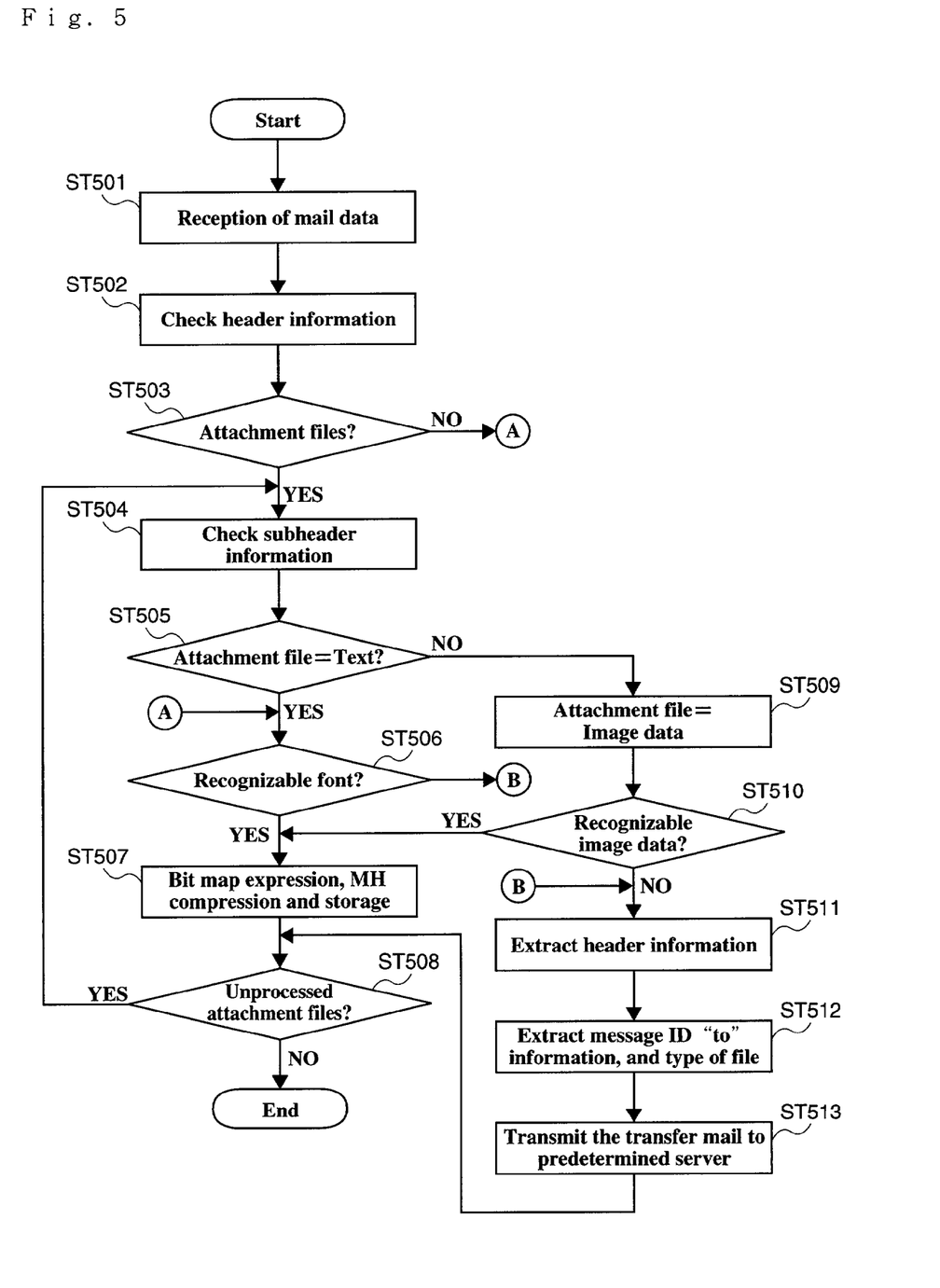
FIG. 5 is a flowchart illustrating an operation when the Internet facsimile apparatus according to the embodiment of the present invention receives an electronic mail and transfers, if necessary, attachment files to a predetermined conversion server.

Next, an operation performed when the IFAX 1 of the present embodiment having the construction as described above receives an electronic mail shown in FIG. 4, and transfers, if necessary, attachment files of the electronic mail to the conversion server 4, is explained. FIG. 4 shows an example of an electronic mail received by the IFAX 1. FIG. 5 is a flowchart illustrating an operation when the IFAX 1 of the present invention receives an electronic mail and transfers, if necessary, attachment files of the electronic mail to the conversion server 4.

The electronic mail shown in FIG. 4 is in compliance with a MIME (Multi-Purpose Internet Mail Extensions) format. In this embodiment, it is assumed that four attachment files are attached to the electronic mail. It is also assumed that the four attachment files include a Text data file, a Tiff file, an MS-word file and a Jpeg file.

First, the IFAX 1 receives the electronic mail shown in FIG. 4 from the PC 5 on the Internet 3 via the LAN 2 (ST501). This electronic mail is sent to the mail analyzer 32 via the network connection section 20 and the electronic mail transceiver section 31.

When the electronic mail is received, the mail analyzer 32, first, checks header information 401 of the electronic mail shown in FIG. 4 (ST502), and checks whether there is an attachment file in the electronic mail (ST503). More specifically, the mail analyzer 32 determines whether the "Content-Type" of the header information 401 is "Multipart/Mixed". Then, when it is determined that the "Content-Type" of the header information 401 is the "Multipart/Mixed", the mail analyzer 32 determines that the received electronic mail has an attachment file.

In FIG. 4, since the "Content-Type" of the header information 401 is the "Multipart/Mixed", the mail analyzer 32 determines that the received electronic mail has an attachment file and advances the process to ST504.

Then, the mail analyzer 32 checks subheader information 402a of the electronic mail shown in FIG. 4 (ST504), and determines whether the attachment file is a Text data file (ST505). More specifically, the mail analyzer 32 determines whether the "Content-Type" of the subheader information 402a is "Text/Plain". Then, when the "Content-Type" of the subheader information 402a is "Text/Plain", the mail analyzer 32 determines that the attachment file is a text data file.

In FIG. 4, since the "Content-Type" of the subheader information 402a is the "Text/Plain", the mail analyzer 32 determines that the attachment file is a text data file, and advances the process to ST506.

Note that, when, in ST503, it is determined that the electronic mail received by the mail analyzer 32 does not have an attachment file, the mail analyzer 32 advances the process to ST506.

In ST506, the mail analyzer 32 determines whether the font of the subheader information 402a is a recognizable font. More specifically, the mail analyzer 32 checks a code indicating a font in the subheader information to determine whether the font is recognizable or not.

In FIG. 4, the code indicating the font is "US-ASCII" and the "ISO-2022-JP". The "US-ASCII" indicates a standard ASCII, and "ISO-2022-JP" indicates a JIS code. Accordingly, the mail analyzer 32 determines that the font is recognizable.

When the mail analyzer 32 determines that the font of the subheader information is recognizable in ST506, the facsimile communication section 15 expands the attachment file to bitmap data, applies a MH compression process to the bitmap data, and stores the compressed data into the mail data area 35b of the data memory section 35 (ST507).

Simultaneously, the mail analyzer 32 stores a message ID in association with the attachment file into the mail information area 35a. At this time, the mail analyzer 32 also stores a file number, which indicates an order of the attachment file in the electronic mail, a file format and a status indicating whether the attachment file is printable or not. Thus, the predetermined data as described above is stored into the attachment file table 600 as shown in FIG. 6 in the mail information area 35a.

Figure 6:
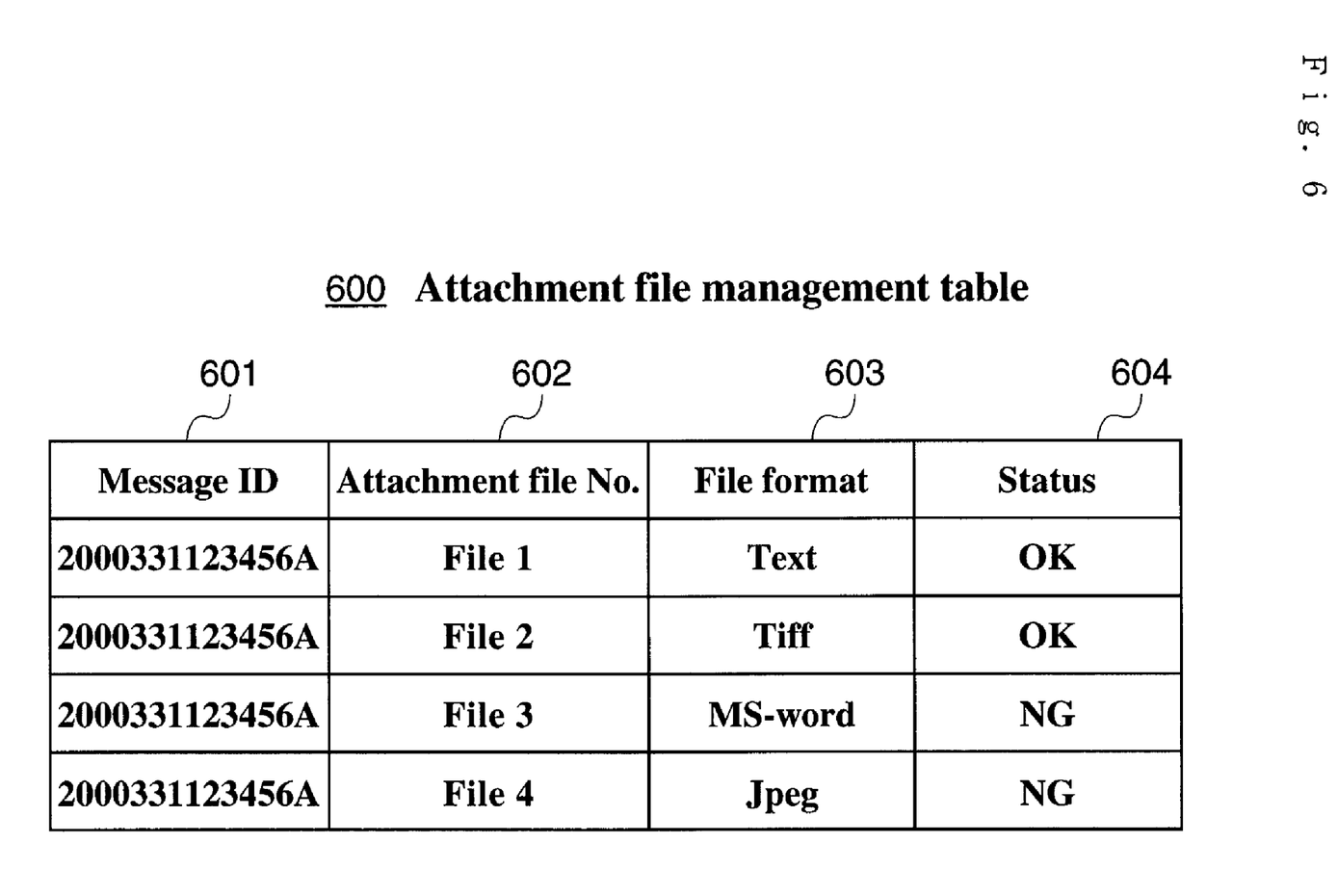
FIG. 6 shows an attachment file table stored in a mail data area of the Internet facsimile apparatus according to the embodiment of the present invention.

Here, as shown in FIG. 6, "200331123456A", "file 1", "Text" and "OK" are stored as the message ID 601, the attachment file number 602, the file format 603 and the status 604, respectively.

Then, after these data are stored in the data memory section 35, the mail analyzer 32 determines whether there is an attachment file to which the above-described process is not applied, is included in the electronic mail shown in FIG. 4 (ST508). More specifically, the mail analyzer 32 checks whether there is subheader information of the electronic mail to determine whether there is an unprocessed attachment file.

In FIG. 4, since there is subheader information 402b, the mail analyzer 32 determines that there is an unprocessed attachment file, and returns the process to ST504. Then, similar to the above-described process, the mail analyzer 32 checks the subheader information 402b of the electronic mail shown in FIG. 4 (ST504), and determines whether an attachment file is a Text data file (ST505).

At this time, since the "Content-Type" of the subheader information 402b is "image/Tiff", the mail analyzer 32 determines that the attachment file is not a text data file, and advances the process to ST509.

In ST509, the mail analyzer 32 determines that the attachment file is image data. Then, the mail analyzer 32 determines whether the image data of the attachment file is recognizable image data (ST510). More specifically, the mail analyzer 32 checks whether the "Content-Type" of the subheader information 402b is "image/Tiff". Then, when the "Content-Type" of the subheader information 402b is the "image/Tiff", the mail analyzer 32 determines that the image data of the attachment file is recognizable.

Here, since the "Content-Type" of the subheader information 402b is the "image/Tiff", the mail analyzer 32 determines that the image data of the attachment file is recognizable.

Then, when the mail analyzer 32 determines that the image data of the attachment file is recognizable image data, similar to the process as described above, the facsimile communication section 15 expands the attachment file to bitmap data, applies an MH compression process to the bitmap data, and stores compressed data into the mail data area 35b of the data memory section 35 (ST507).

In this process, similar to the process for the text data file described above, predetermined data is stored into the attachment file table 600 in the mail information area 35a. In other words, "2000331123456A", "file 2", "Tiff" and "OK" are stored as the message ID 601, the attachment file number 602, the file format 603, and the status 604, respectively. Then, similar to the process as described above, the mail analyzer 32 checks whether the electronic mail shown in FIG. 4 further includes an attachment file to which the above-described process is not applied (ST508).

In FIG. 4, since there is subheader information 402c, the mail analyzer 32 determines that there is an unprocessed attachment file, and returns the process to ST504. Then, similar to the process as described above, the mail analyzer 32 performs the process of ST504, ST505, ST509 and ST510. Then, in the determination of ST510, since the "Content-Type" of the subheader 402c is "application/MSword", the mail analyzer 32 determines that the image data of the attachment file is not recognizable image data, and advances the process to ST511.

Note that, when it is determined that the font of the subheader information 402c is not recognizable font in ST506, the mail analyzer 32 advances the process to ST511.

The mail data extraction unit 33 extracts data necessary to construct header information of a transfer mail from the electronic mail shown in FIG. 4 (ST511). More specifically, the mail data extraction section 33 extracts data surrounded by rectangles in FIG. 4. In other words, the message ID (200033123456A), information following to "to:", which is destination address information, and a type of the attachment file (application/msword) are extracted (ST512).

Figure 7:
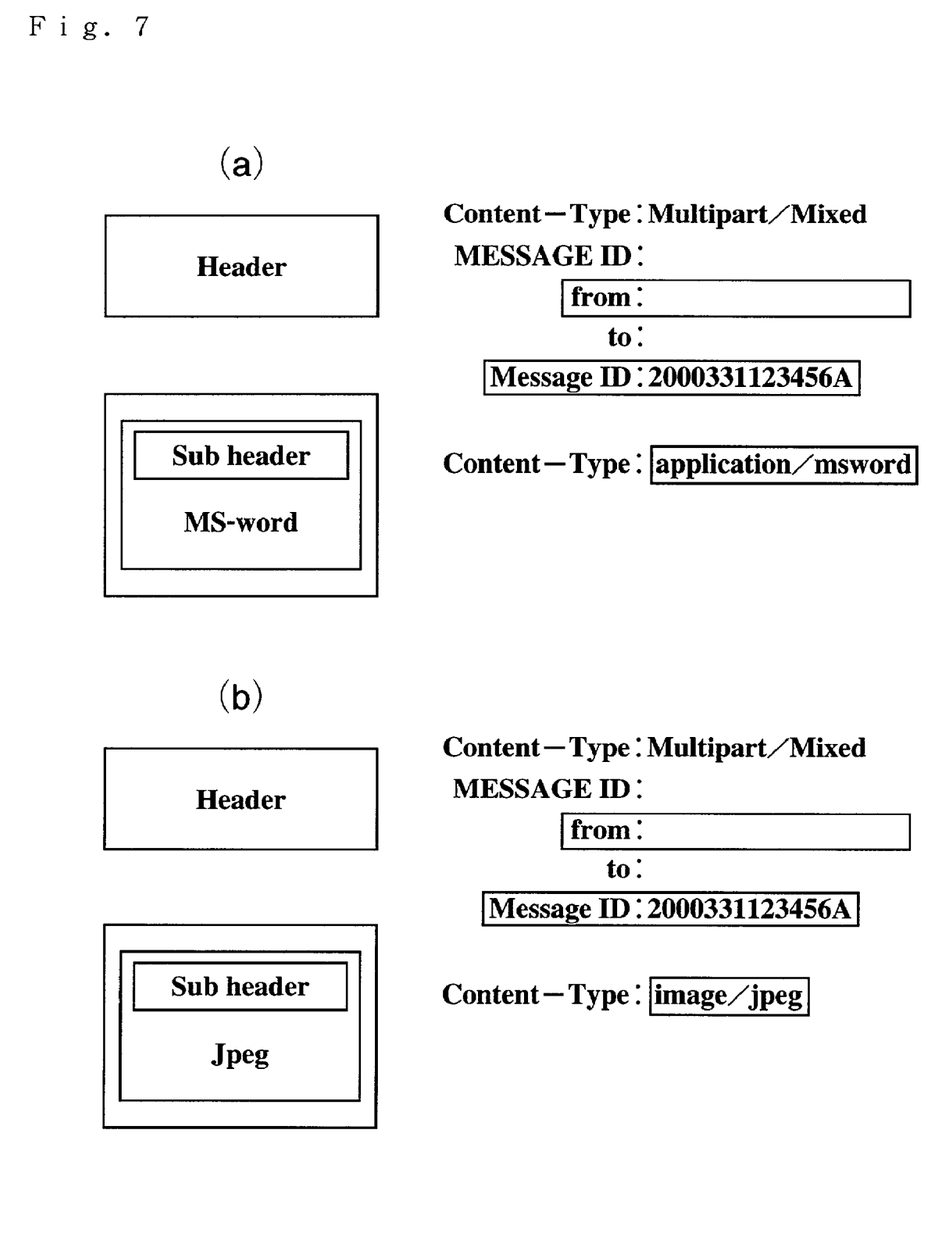
FIG. 7(a) is a view illustrating an example of a transfer mail transferred by the Internet facsimile apparatus according to the embodiment of the present invention.
FIG. 7(b) is a view illustrating another transfer mail transferred by the Internet facsimile apparatus according to the embodiment of the present invention.

When the mail data extraction section 33 extracts the predetermined (necessary) data, the transfer mail data generation section 34 generates a transfer mail based on the extracted predetermined data. More specifically, the transfer mail data generation section 34 generates a transfer mail as shown in FIG. 7(a). As shown in FIG. 7(a), the transfer mail data generation section 34 generates the transfer mail by inserting the predetermined data extracted by the mail data extraction section 33 to a predetermined position in the transfer mail.

More specifically, the message ID extracted from the electronic mail shown in FIG. 4 is inserted into header information of the transfer mail. Further, the "to:" information, which is the extracted destination address information, is inserted into "from:" information, which indicates sender information. Further, the extracted type of the attachment file is inserted into "Content-Type" of the attachment file. Thus, the transfer mail is generated. In addition, the attachment file of the received electronic mail is attached to the transfer mail.

Then, when the transfer mail is generated, the transfer mail data generation section 34 transmits the transfer mail to the conversion server 4 via the electronic mail transceiver section 31 and the network connection section 20 (ST513).

In this case, similar to the process described above, predetermined data is stored into the attachment file table 600 in the mail information area 35a. In other words, "2000331123456A", "file 3", "MS-word" and "NG" are stored as the message ID 601, the attachment file number 602, the file format 603 and the status 604, respectively. Then, similar to the process as described above, the mail analyzer 32 checks whether the electronic mail shown in FIG. 4 further includes an attachment file to which the above-described process is not applied (ST508).

In this embodiment, similar to the process performed when the attachment file is MS-word, the process of ST504, ST505 and ST509 through ST513 are performed, when the attachment file is a Jpeg file. FIG. 7(b) shows a transfer mail that is transmitted in ST513, when the attachment file is a Jpeg file. Then, similar to the process described above, predetermined data is stored into the attachment file table 600 in the mail information area 35a. In other words, "2000331123456A", "file 4", "Jpeg" and "NG" are stored as the message ID 601, the attachment file number 602, the file format 603 and the status 604, respectively.

Then, after these processes are finished, when the mail analyzer 32 determines that there is no unprocessed attachment file in ST508, the operation in which the IFAX 1 receives an electronic mail and transfers, if necessary, an attachment file to the conversion server 4 terminates.

Figure 8:
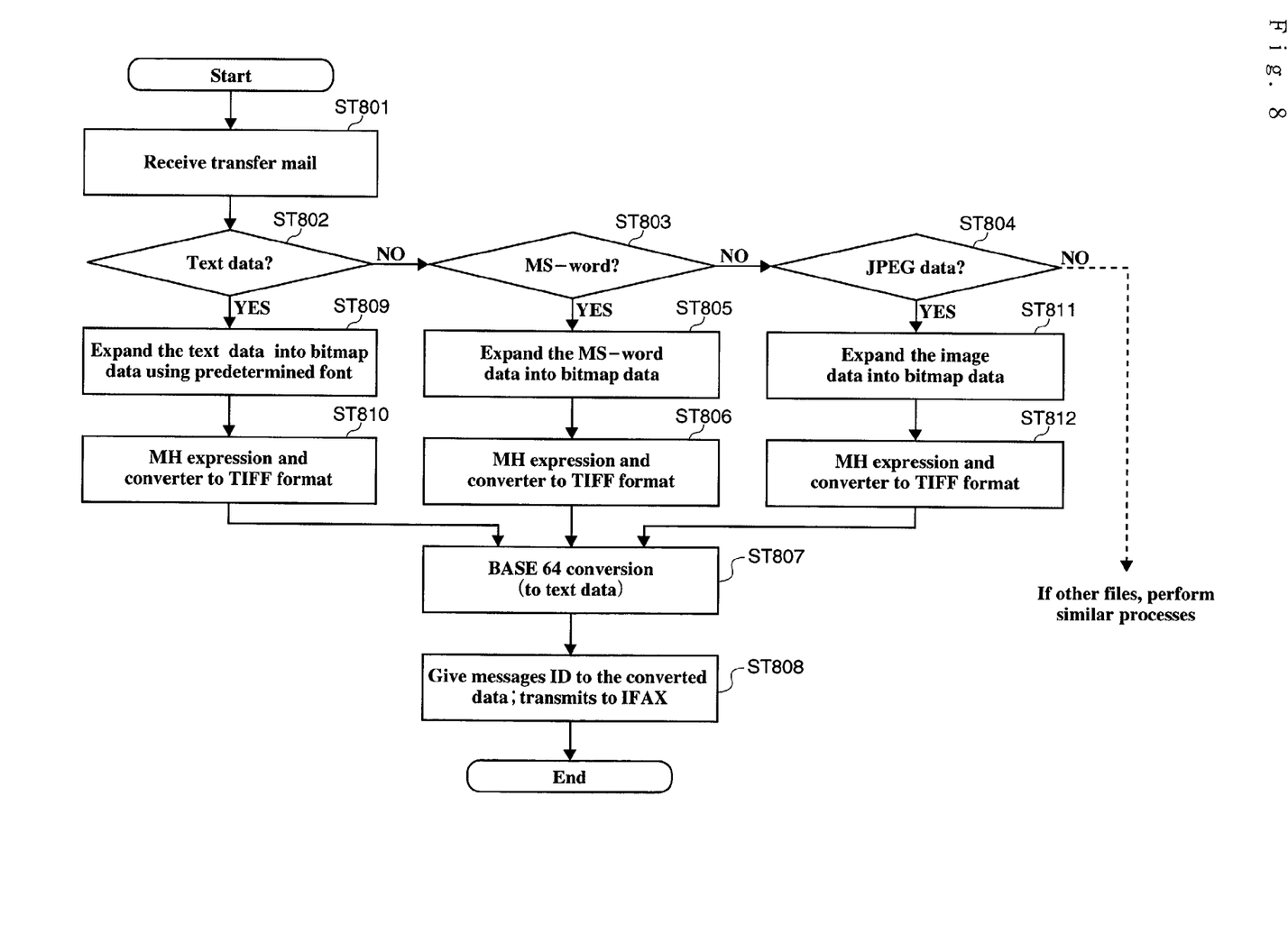
FIG. 8 is a flowchart illustrating an operation when the conversion server converts the attachment files of the transfer mail transferred from the Internet facsimile apparatus according to the embodiment of the present invention and returns the converted attachment files.

Next, an operational flow in which the conversion server 4 converts an attachment file of the transfer mail from the IFAX 1 into a data file which is processible in the IFAX 1, is explained with reference to FIG. 8. FIG. 8 is a flowchart illustrating an operation in which the conversion server 4 converts the attachment file of the transfer mail is received from the IFAX 1 into a data file processible by the IFAX 1.

First, the conversion server 4 receives a transfer mail from the IFAX 1 (ST801). It is assumed that the transfer mail shown in FIG. 7(a) is received.

When the transfer mail is received from the IFAX 1, the conversion server 4 checks the file format of the attachment file of the transfer mail.

More specifically, first, the conversion server 4 determines whether the attachment file is a text data file (ST802). Then, when the attachment file is not a text data file, the conversion server 4 determines whether the attachment file is a MS-word file (ST803). Further, when the attachment file is not a MS-word file, the conversion server 4 determines whether the attachment file is a Jpeg file (ST804).

Here, since the attachment file of the transfer mail shown in FIG. 7(a) is a MS-word file, the conversion server 4 expands the MS-word data into bitmap data by using a predetermined converter (ST805).

Then, the conversion server 4 applies the MH compression to the expanded bitmap data, and converts the compressed data into a Tiff format (ST806). Thereafter, the conversion server 4 converts the data converted into the Tiff format into text data according to BASE64 (ST807). Note that, although the BASE64 is used for the conversion to the text data in this embodiment, the other encoding method can be used, instead.

Then, the conversion server 4 gives the data converted into the text data the message ID ("2000331123456A" in the present embodiment) of the transfer mail received in ST801, and sends the converted text data to the IFAX 1 of the sender (ST808). As described above, the electronic mail to be received back is called a "reply mail". Thus, the operation in which the conversion server 4 converts the attachment file of the transfer mail into a data file that is processible by IFAX 1 terminates.

Although, in the above description, a case in which the attachment file of the transfer mail is MS-word is discussed, a similar process is performed when it is determined in either ST802 or ST804, that the attachment file is either a text data file or a Jpeg file.

In other words, when it is determined in ST802 that the attachment file is a text data file, the conversion server 4 expands the text data file into bitmap data by using a predetermined font (ST809). Then, the conversion server 4 applies MH compression to the expanded bitmap data and converts the compressed data into Tiff format (ST810). Thereafter, the conversion server 4, similar to the process described above, converts the data converted into the Tiff format into text data according to BASE64 (ST807), gives the converted text data the message ID of the transfer mail received in ST801, and transmits the converted text data with the message ID to the IFAX 1 of a sender (ST808).

On the other hand, when it is determined in ST804 that the attachment file is a Jpeg file, the conversion server 4 expands the image data of the Jpeg file into bitmap data by using a predetermined converter (ST811). Then, the conversion server 4 applies the MH compression to the expanded bitmap data and converts the compressed data into Tiff format (ST812). Then, the conversion server 4 converts the data converted into the Tiff format into text data according to BASE64 (ST807). Thereafter, the conversion server 4 gives the data converted into the text data the message ID of the transfer mail received in ST801, and transmits the text data with the message ID to the IFAX 1 of the sender (ST808).

In the above-described embodiment, the conversion server 4 that can convert the text data file, the MS-word file and the Jpeg file, is discussed. However, it is possible to provide the conversion server 4 that performs conversion process for the other file format as well, and transmits the converted data to the IFAX 1.

Figure 9:
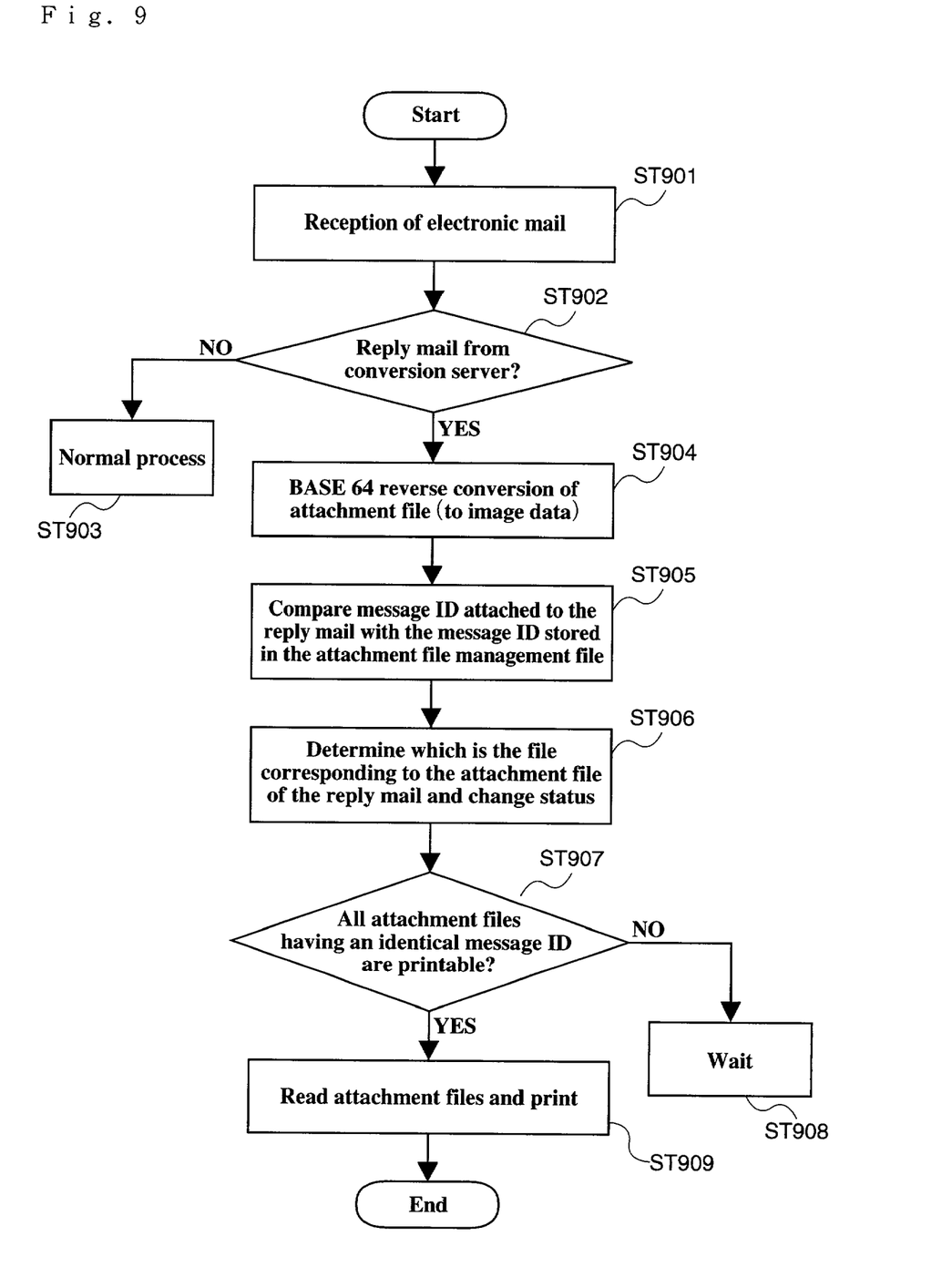
FIG. 9 is a flowchart illustrating an operation when the Internet facsimile apparatus according to the embodiment of the present invention receives a reply mail from the conversion server, and prints the electronic mail received from the PC.

Next, an operational flow in which the IFAX 1 receives a reply mail from the conversion server 4 and prints an electronic mail received from the PC 5, is explained with reference to FIG. 9. FIG. 9 is a flowchart illustrating an operation in which the IFAX 1 receives a reply mail from the conversion server 4 and prints an electronic mail received from the PC 5. Here, a case in which, the attachment file is a MS-word file, and the conversion server 4 performs a conversion process for the attachment file and the data file after the conversion process is attached to the reply mail and returned (transmitted back) to the IFAX 1, is discussed.

Note that the reply mail from the conversion server 4 is an electronic mail corresponding to the transfer mail shown in FIG. 7(a). In other words, in FIG. 7(a), "to:" information, which is destination address information, and "from:" information, which is sender address information, are exchanged with each other, and the file format of the attachment file before the conversion is inserted into the reply mail as information.

First, the IFAX 1 receives an electronic mail (reply mail) from the conversion server 4 (ST901). The electronic mail is passed to the mail analyzer 32 via the network connection section 20 and the electronic mail transceiver section 31.

When the electronic mail is received, the mail analyzer 32 checks whether the electronic mail is a reply mail from the conversion server 4 (ST902). More specifically, the mail analyzer 32 checks the header information of the electronic mail, and determines whether the "from:" information, which is a sender address information, is the electronic mail address of the conversion server 4 to determine whether the electronic mail is a reply mail from the conversion server 4.

When it is determined that the electronic mail is not a reply mail from the conversion server 4, the mail analyzer 32 performs a reception process for a usual (normal) electronic mail (ST903). In other words, the reception process for the usual electronic mail is performed according to the flowchart shown in FIG. 5.

On the other hand, when the mail analyzer 32 determines that the electronic mail is the reply mail received back from the conversion server 4, the facsimile communication section 15 converts the attachment file of the reply mail from text data to image data, according to BASE64 (ST904).

When the attachment file of the reply mail is converted into image data, the message ID processor 36 compares the message ID ("2000331123456A" in this embodiment) of the reply mail with the message ID stored in the attachment file table 600 shown in FIG. 6 (ST905).

Then, the message ID processor 36 determines which file stored in the attachment file table 600 corresponds to the attachment file of the reply mail, and changes the status 604 of the corresponding file (ST906). More specifically, the message ID processor 36 refers to the file format before conversion, inserted to the reply mail, to determine which file stored in the attachment file table 600 corresponds to the attachment file of the reply mail.

Here, the message ID processor 36 searches the attachment file table 600 for a MS-word file, which is the file format before conversion of the attachment file attached to the reply mail, and determines that the attachment file of the reply mail corresponds to the file having "file 3" as the attachment file number 602 in the attachment file table 600. Then, the message ID processor 36 changes the status 604 of the "file 3" from "NG" to "OK".

Next, the message ID processor 36 determines whether all attachment files having an identical message ID stored in the attachment file table 600 are printable (ST907). More specifically, the message ID processor 36 checks whether each status 604 associated with an identical message ID stored in the attachment file table 600 is "OK" to determine whether all attachment files having an identical message ID are printable.

Here, since all attachment files having an identical message ID (200033123456A) are not printable, the IFAX 1 waits for another reply mail to which an attachment file having the identical message ID (ST908) is attached. Then, when a corresponding reply mail is received, a process starting from ST901 is performed again.

When it is determined that all attachment files having the identical message ID become printable in ST907, in other words, when a reply mail to which a data file converted from the Jpeg file is attached, is received back from the conversion server 4, the message ID processor 36 notifies the print instruction section 37 of the status.

When the notification is received, the print instruction section 37 gives an instruction for the printer 17 to print the data corresponding to the message ID. In response to the instruction, the printer 17 receives the data corresponding to the message ID from the data memory section 35, and performs a print process (ST909).

Thus, the operational flow in which the IFAX 1 receives a replay mail from the conversion server 4 and prints an electric mail received from the PC terminal.

As described above, it is determined whether all attachment files stored in the attachment file table 600 are printable. Then, when it is determined that all attachment files are printable, an instruction is given to print attachment files included in the received electronic mail. In other words, since printing of the electronic mail data is controlled in accordance with a status (indication) indicating whether the reply mail has been received back from the conversion server 4, even if an electronic mail including an attachment file that is not printable is received, printing of the electronic mail can be performed normally.

In this embodiment, the case in which a text data file and a Tiff file, which are printable, and a MS-word file and a Jpeg file, which are not printable, are stored in the attachment file table 600 is discussed. The printable attachment file attached to the electronic mail is printed at the same time as an unprintable attachment file, after a reply mail is received with an attachment file that is converted from the unprintable attachment file. Accordingly, even when an electronic mail including both a printable attachment file and an unprintable attachment file is received, since printing of the electronic mail data is controlled in accordance with the status (indication) indicating whether the reply mail has been received back from the conversion server, the printing of the electronic mail can be performed normally.

On the other hand, when only unprintable attachment files are attached to the electronic mail, printing is performed after all the reply mails that correspond to these unprintable attachment files, and to which attachment files after conversion are attached, are received back from the conversion server 4. In this case, since the printing of the electronic mail data is controlled according to reception (reply) statuses of the reply mail from the conversion server 4, the printing of the electronic mail can be performed normally.

In the flowchart shown in FIG. 9, the IFAX 1 that performs printing when all attachment files are received back from the conversion server 4 is discussed. However, alternatively, it is possible to modify the process in ST907 so that, for example, when a particular attachment file has not been received back even after a predetermined period elapses, the message ID processor 36 can print only the attachment file that has already been received back, and/or an attachment file that does not require conversion (i.e., originally printable). In this case, it is possible to prevent a case in which all of the attachment files attached to the electronic mail are not printed when there is an attachment file that is not received back due to some causes. In addition, in this case, it is preferable to output which attachment file is not printed by the printer 17. Thus, by informing the user of the attachment file that could not be printed, it is possible to call the user's attention to this. Accordingly, it is possible to avoid the case that unprintable data included in the electronic mail remains unprinted.

As described above, according to the IFAX 1 of this embodiment, when an electronic mail including plural attachment files that are unprintable by the apparatus body itself (IFAX 1), transfer mails including the unprintable attachment files are transmitted to the conversion server 4. Then, the IFAX 1 receives reply mails including printable attachment files converted by the conversion server 4, and performs printing process for the attachment files. When the plural attachment files are transmitted to the conversion server 4, the IFAX 1 stores identification information of the attachment files to the attachment file table 600. Then, when the transferred attachment files are converted by the conversion server 4, and the IFAX 1 receives back all reply mails with converted attachment files, the IFAX 1 performs printing process. Accordingly, even when the attachment files are received back at different timings due to the delay of the conversion process at the conversion server 4 or workload of the conversion server 4, the printing process is performed only when all the attachment files have been received back and become printable. Accordingly, even if an electronic mail including a variety of attachment files that are not printable by the apparatus body itself is received, the print process can be performed normally.

In the present embodiment, the attachment file attached to the reply mail is identified by using a message ID (2000331123456A) of the electronic mail transmitted to the IFAX 1 from the PC 5 and the attachment file format 603 stored in the file management table 600. Thus, when the reply status of data converted from the unprintable data is controlled (identified) by identification information of the electronic mail including the unprintable data, the reply status can be indicated (controlled) securely. Accordingly, the Internet facsimile apparatus is prevented from an error operation.

However, the way of identification is not limited thereto. Instead, it is possible, by giving both the transfer mail and the reply mail a message ID (for example, 2000331123456a-1, or 2000331123456a-2) that can identify both the electronic mail transmitted from the PC 5 to IFAX 1 and the attachment files attached to the electronic mail, and to identify the attachment file attached to the reply mail by using the message ID. In this case, it is possible to obtain the same effects as those of the IFAX 1 in the embodiment described above.

Further, in the present embodiment, a case in which the attachment files are transmitted to a single conversion server 4, which is connected on the Internet 3, is discussed. In addition, the case in which the conversion server 4 can always convert the variety of types of data files is discussed. However, considering the limitation (or ability) of the single conversion server 4 to convert data files, it is preferable to transmitting the attachment files to plural conversion servers 4 connected on the LAN 2 or Internet 3. In this case, each IFAX 1 or conversion server 4 recognizes, in advance, which type of data file can be converted by which of the conversion servers. When a data file in an electronic mail is received, the attachment file is transferred by designating the conversion server that can convert such a type of the data file. Thus, it is possible to obtain the same effects as those of the above-described embodiment.

As described above, according to the present invention, when an electronic mail includes plural data files that cannot be processed by the apparatus body itself, the data files are transferred to a predetermined conversion server, and printing is controlled based on the reception (reply) status (indication) that the data files after conversion have been received back from the conversion server. Accordingly, an electronic mail including plural data files that cannot be processed by the apparatus body itself, can be printed normally.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. 2000-212679, filed on Jul. 13, 2000, which is herein expressly incorporated by reference in its entirety.

What is claimed is:

1. An Internet facsimile apparatus connected to a server apparatus, the Internet facsimile apparatus comprising:
a network connector configured to receive an e-mail to which a plurality of data files are attached;
a memory configured to store data;
a printer configured to print data; and
a controller configured to store the plurality of data files in the memory, to provide a predetermined message ID to each of the plurality of data files attached to the e-mail, to determine whether the plurality of data files include an unprintable data file which the printer can not print, to transmit, to the server apparatus, the unprintable data file including the predetermined message ID, the server apparatus converting the unprintable data file into a printable data file which the printer can print, to receive, from the server apparatus, the converted printable data file including the predetermined message ID, and to control the printer to print the plurality of data files corresponding to the predetermined message ID when all of the plurality of the data files corresponding to the predetermined message ID are printable.

2. The Internet facsimile apparatus according to claim 1, wherein the controller controls the printer to print a data file of the plurality of the data files which the printer can print, when all of the plurality of the data files having the predetermined message ID do not become printable within a predetermined time.

3. The Internet facsimile apparatus according to claim 2, wherein the controller controls the printer to print information regarding a data file which the printer cannot print, when the controller controls the printer to print the data file of the plurality of the data files which the printer can print.

4. The Internet facsimile apparatus according to claim 1, wherein the plurality of the data files comprise a plurality of file types.

5. The Internet facsimile apparatus according to claim 4, wherein the plurality of file types comprise a Text data file, a Tiff file, an MS-word file and a J-peg file.

6. The Internet facsimile apparatus according to claim 1, the predetermined message ID being the same for each of the plurality of data files attached to the e-mail.

7. A printing method utilizing on an Internet facsimile apparatus connected to a server apparatus via a network, the printing method comprising:

receiving an e-mail to which a plurality of data files are attached;

storing the plurality of data files;

providing a predetermined message ID to each of the plurality of the data files attached to the e-mail;

determining whether the plurality of data files include an unprintable data file which the printer can not print;

transmitting, to the server apparatus, the unprintable data file including the predetermined message ID, the server apparatus converting the unprintable data file into a printable data file which the printer can print;

receiving, from the server apparatus, the converted printable data file including the predetermined message ID; and printing the plurality of the data files corresponding to the predetermined message ID when all of the plurality of the data files corresponding to the predetermined message ID are printable.

8. The printing method according to claim 7, the providing a predetermined message ID comprising using a same predetermined message ID for each of the plurality of data files attached to the e-mail.

* * * * *